United States Patent Office 3,204,978
Patented Sept. 7, 1965

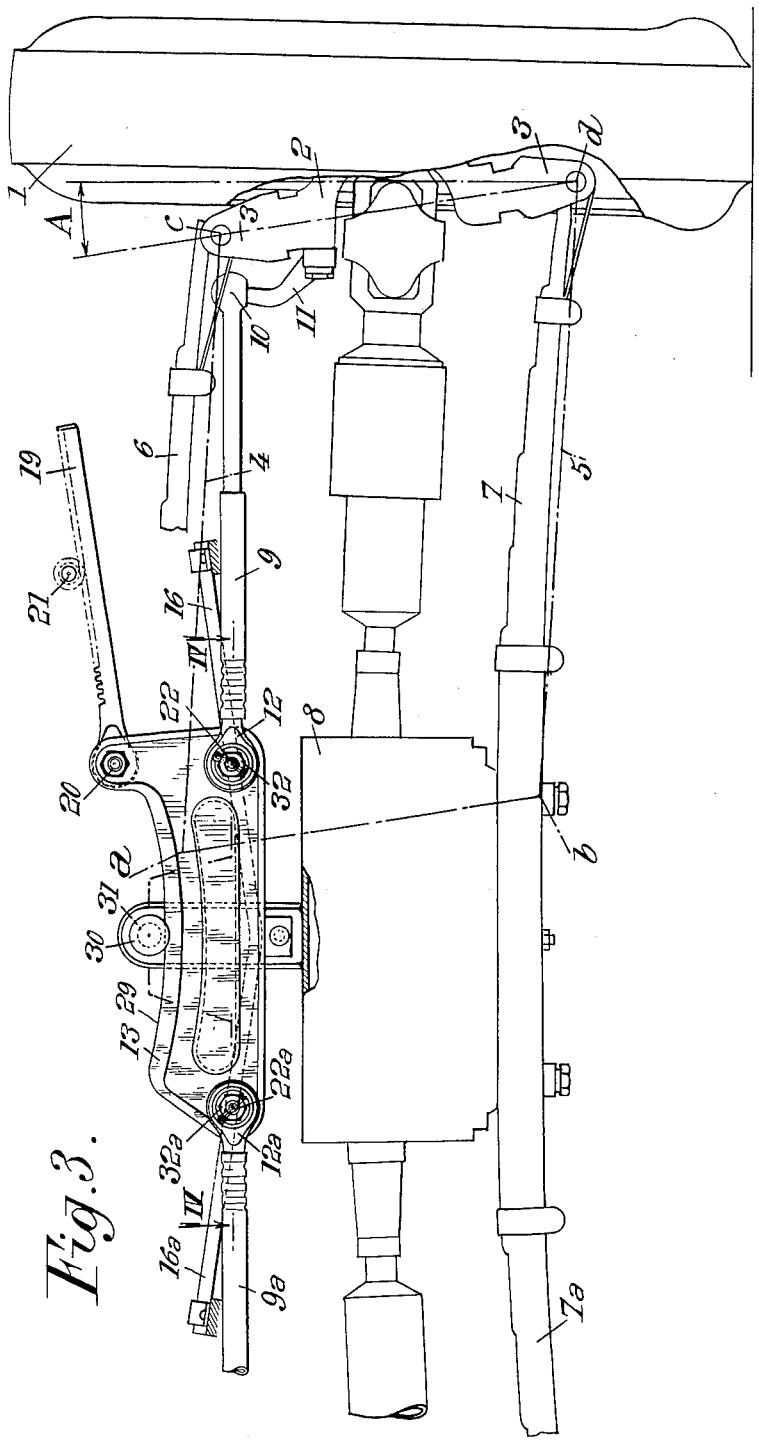

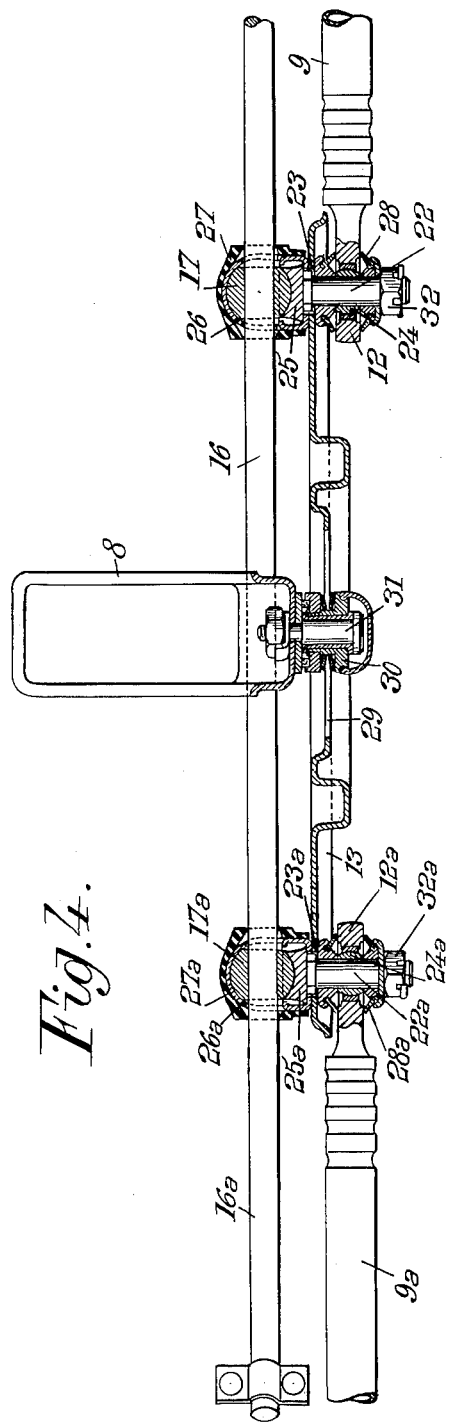

3,204,978
STEERING LINKAGE ARRANGEMENT FOR
INDEPENDENTLY SUSPENDED WHEELS
Paul Panhard, Paris, France, assignor to Société Anonyme
des Anciens Etablissements Panhard & Levassor, Paris,
France, a society of France
Filed Nov. 19, 1963, Ser. No. 324,760
Claims priority, application France, Nov. 21, 1962,
916,196
7 Claims. (Cl. 280—95)

The present invention relates to vehicles the steered wheels of which are each mounted on a stub axle pivot bearing (or two such bearings) inclined laterally and belonging to a transverse deformable parallelogram, or similar structure, said wheels being linked together by means of transverse drag links hinged respectively at their outer ends to knuckle arms carried by the wheel stub axles and at their inner ends to a common movable and rigid member, the invention being more especially concerned with steering gears of the rack type.

It is known that the point where each drag link is hinged to the knuckle arm of the corresponding steered wheel occupies a position which is determined on the one hand by the connection of said link with said movable member and on the other hand by the connection of the wheel stub axle pivot bearings with the corresponding deformable parallelogram. For a given position of said movable member, the first connection compels said point to move along a first circular arc having its center on the movable member and the radius of which is equal to the length of the drag link and the second connection compels each of said points to move along a second circular arc the radius of which is equipollent to the substantially horizontal sides of the deformable parallelogram. Prior to the present invention, the movable member was guided in such manner that the point where the drag links are hinged to said member moved approximately along a common transverse horizontal straight line. In order to obtain that the vertical movements of the wheels relatively to the vehicle body corresponding to deformations of the suspension parallelograms have an influence as small as possible upon the respective steering angles of the wheels, the arrangement used up to now was such that, for a mean position (movement of the vehicle along a straight line), said circular arcs substantially coincided with each other, that is to say were in general tangent to each other. But this condition was no longer complied with when the wheels were turned on one side or the other, due to the fact that the center of the first circular arc, located upon the movable member, remained at the same height with respect to the vehicle frame, whereas the center of the second circular arc, located upon the knuckle arm, had its height changed due to the lateral inclination of the stub axle pivot bearing.

The object of the present invention is to provide a vehicle such that the steering angles of the steered wheels are practically independent of the respective deformations of the suspension parallelograms and this whatever be the instantaneous values of these angles, that is to say not only, as was the case up to now, when said steering angles are practically equal to zero.

For this purpose, the vehicle according to the present invention is characterized in that it comprises means for guiding said movable member such that the points at which the drag links are hinged to said member move along respective paths at least substantially parallel to those along which move the points where said links are hinged to the corresponding knuckle arms, respectively.

Preferred embodiments of the present invention will be hereinafter described with reference to the appended drawings, given merely by way of example, and in which:

FIG. 3 is a view similar to FIG. 1 but relating to a second embodiment of the invention;

FIG. 4 shows, on an enlarged scale, a horizontal section on the line IV—IV of FIG. 3.

Figure 1:
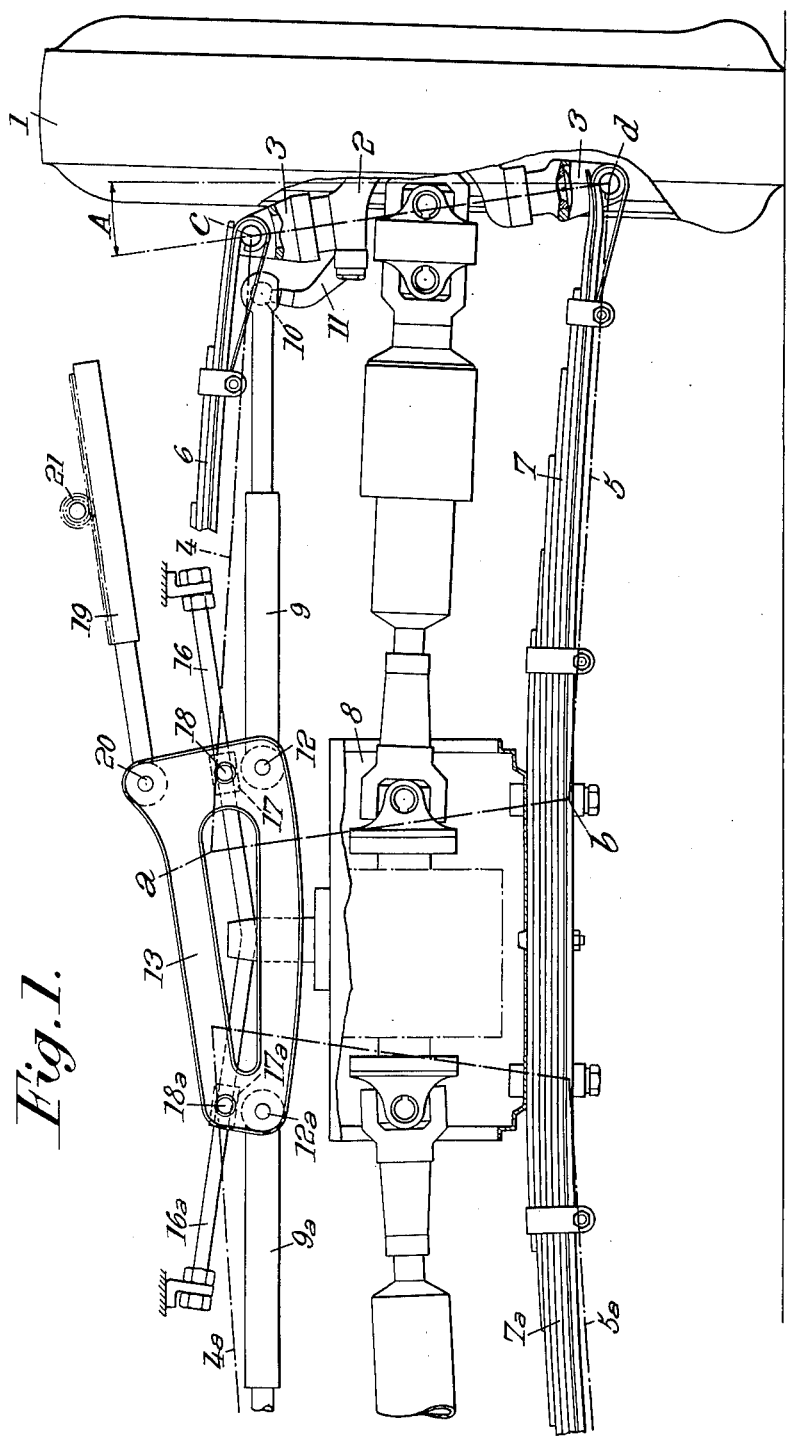
FIG. 1 is a partial elevational view with parts in section, showing the suspension and steering means of a vehicle made according to a first embodiment of the invention.

The invention relates to a vehicle the steered wheels of which, one of which is shown at 1 in FIGS. 1 and 3, each carry a structure of fixed length including a stub axle 2 carrying two coaxial pivots, and, cooperating with said pivots, respectively, two pivot bearings 3 the common axis of which makes laterally an angle A with the vertical, said common axis forming one side of a deformable parallelogram $a$–$b$–$c$–$d$. The substantially horizontal sides 4 and 5 of this parallelogram consist for instance of leaf springs 6 and 7 disposed in a transverse vertical plane and secured at their inner ends $a$ and $b$ to the vehicle frame, pivot bearings 3 being fixed to the free outer ends $c$ and $d$ of these springs. As a rule, as shown by the drawings, each of the springs 6 and 7 is a portion of a single transverse spring extending from one side to the other of the vehicle. For instance the lower sides 5 and 5$a$ of the two symmetrical parallelograms corresponding respectively to the front wheels are portions of the lower spring 7–7$a$. To sum up, each of these front wheels, for instance wheel 1, corresponds to a parallelogram $a$–$b$–$c$–$d$, the side $a$–$b$ of this parallelogram being fixed with respect to the vehicle frame 8.

The steered wheels are controlled through transverse drag links 9 and 9$a$. Drag link 9, for instance, is hinged at its outer end, at 10, to a knuckle arm 11 fixed to the pivots of wheel 1, whereas the inner end of said drag link 9 is hinged, at 12, to a movable rigid member 13, common to both of the front wheels.

In order better to explain the invention, reference will now be made to FIG. 2, where the sides of the right-hand parallelogram of FIG. 1 have been illustrated by portions of straight lines.

It will be seen that, for a given position of movable member 13, that is to say of point 12, hinge point 10, due to the fact that it belongs to link 9, is compelled to move along a first circular arc having its center at 12 since the distance between points 10 and 12 (length of link 9) is constant. Furthermore, hinge point 10, due to the fact that it belongs to lever 11, is compelled to move in the same manner as points $c$ and $d$ along a second circular arc the radius of which is equipollent to sides 4 and 5, for a constant steering angle, when parallellogram $a$–$b$–$c$–$d$ is deformed. In order to obtain that the vertical displacements of wheel 1 have a minimum influence upon the steering angle of said wheel it is therefore theoretically necessary, as shown by FIG. 2, to position pivot point 12 in such manner that the two above mentioned circular arcs coincide together and form a single arc B, for a mean position of member 13, this condition being equivalent to making link 9 parallel to the sides 4 and 5 of the parallelogram and of the same length as these sides. For constructional reasons, generally, as shown by FIG. 1, pivot point 12 is given a position such that the two circular arcs in question are approximately tangent.

Up to this time movable member 13 was arranged in such manner as to be able to have a translatory movement in a transverse horizontal direction, whereby pivot point 12 was capable of coming at the same height, at $12_1$, when the wheel was given a steering displacement, whereby the other end of link 9 moved from 10 to $10_1$. Due to the inclination A of pivot bearings 3 with respect to the vertical, point 10 thus came to a different level, for instance to a higher level, at $10_1$, for the direction of steering illustrated by FIG. 2. Thus link 9 compelled point $10_1$ to move along a first circular arc C having its center at $12_1$. But the deformations of parallelogram $a$–$b$–$c$–$d$ further compelled point $10_1$ to move along a second circular arc D having its center at $12_2$ such that the line $12_2$–$10_1$ was equipollent to the sides $a$–$c$ or $b$–$d$. Due to the variation of level of point 10, now located at $10_1$. if the two circular arcs along which point 10 was to move coincided with each other (or were tangent to each other) at B, this condition was no longer complied with for circular arcs C and D when point 10 had come into position $10_1$. In other words, when the wheels were steered, the steering angle of each of them varied in accordance with the height thereof with respect to the vehicle body.

Figure 2:
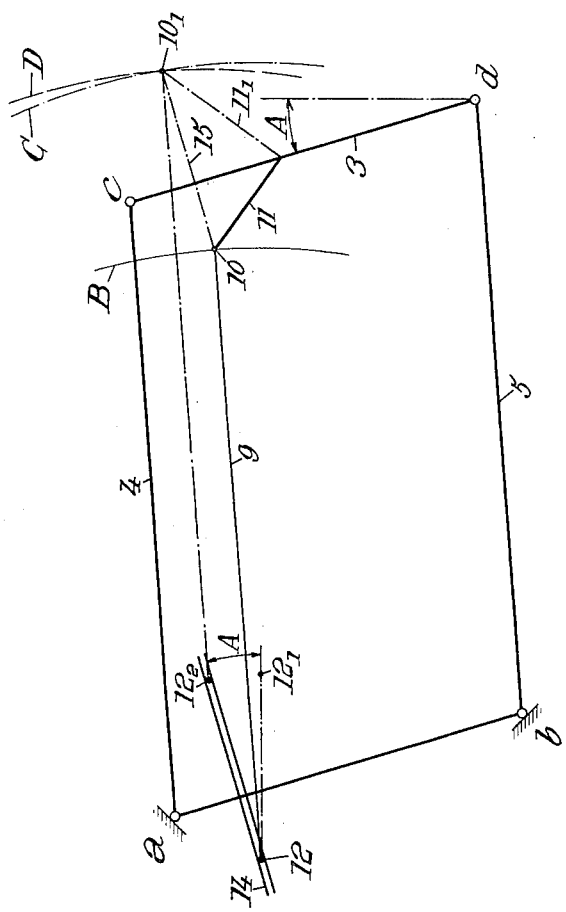
FIG. 2 is a diagrammatical view illustrating the operation and advantages of such means, according to this invention.

In order to obviate this drawback, according to the present invention, movable member 13 cooperates with guiding means such that the pivot points 12 or 12a of drag links 9 or 9a, respectively, move along respective trajectories one of which is indicated by the double line 14 for the pivot point 12 of FIG. 2, each of these trajectories being substantially parallel to the trajectory, such as 15, of the end 10 of the drag link that is considered, where it is hinged to knuckle arm 11. These trajectories are circular arcs which may be considered as coinciding with portions of straight lines located in a vertical transverse plane, said straight lines being at right angles to pivot bearings 3. In other words these trajectories make an angle equal to A with a horizontal plane.

The point 10 of drag link 9 where it is hinged to the corresponding knuckle arm 11 then describes, when the wheels are given a steering displacement, a trajectory contained in a plane orthogonal to bearings 3 and the trace of which upon the vertical plane of FIG. 2 is line 15.

Drag link 9 in vertical projection passes from position 12–10 to position $12_2$–$10_1$, these two positions being practically parallel to each other. The very slight difference of obliquity between the two planes, the respective traces of which on the plane of FIG. 2 are 12–10 and $12_2$–$10_1$, produces at most a very slight variation of curvature of the two circles described by point $10_1$, respectively as belonging to link 9 and as belonging to bearings 3.

Movable member 13 is guided, at two points thereof close to 12 and 12a respectively, by rectilinear rods 16 and 16a (FIG. 1) located in a substantially vertical transverse plane. Each of these rods, for instance 16, is substantially perpendicular to the corresponding pivot line, such as 3—3 and said rods 16 and 16a are secured to the frame of the vehicle. In order to enable member 13 to move along rods 16 and 16a, said member carriers, pivoted thereto at 18 and 18a sleeves 17 and 17a, respectively, said sleeves being slidable on rods 16 and 16a, respectively.

Due to this guiding, the points of movable member 13 located close to pivots 18 and 18a move along lines which may be considered as portions of straight lines parallel to the corresponding rods 16 and 16a, respectively. Owing to this arrangement, member 13 may be controlled through a rack 19 hinged to said member 13 at 20, said pivot 20 being close to pivot 18 and substantially in the same plane at right angles to rod 16, as said pivot 18. Thus rack 19 can be kept in mesh with control pinion 21, since this rack has a translatory movement parallel to its length.

With such a vehicle, a vertical movement of the steered wheels has no influence upon the steering angle, not only as it is known, when this angle is zero or very small, but also when this angle has a substantial value since both of the circular arcs along which $10_1$ is located merge into circular arc 2D due to the fact that links 9 and 9a remain parallel to themselves despite the lateral inclination A of pivot bearings 3.

According to the embodiment of FIGS. 3 and 4 the same elements are used for hinging each drag link 9 (or 9a) with movable member 13 and for securing each sleeve 17 (or 17a) to said member 13. For this purpose, as shown by FIG. 4, each of said elements comprises a pin 22 (or 22a) extending through a hole 23 (or 23a) of member 13 and engaged in the end 12 (or 12a) of the drag link 9 (or 9a). Preferably, as shown, there is interposed, between pin 22 (or 22a) and the drag link end 12 (or 12a), a swivel 24 (or 24a), advantageously of the self lubricating type, which permits the drag link to rotate not only about the axis of pin 22 (or 22a) but also, with a limited amplitude, about its own longitudinal axis. Pin 22 (or 22a) is provided with a head 25 (or 25a) forming a seat for sleeve 17 (or 17a), said sleeve being secured on head 25 (or 25a) by means of a sheet iron casing 26 (or 26a). As shown by FIG. 4, sleeve 17 (or 17a) is preferably ball-shaped (and advantageously of the self lubricating type), head 25 (or 25a) and the corresponding portion of casing 26 (or 26a) being shaped correspondingly. Sleeve (or ball) 17 (or 17a) may be protected against dust by a rubber sleeve 27 (or 27a), and, likewise, swivel member 24 (or 24a) may be protected by a double flange 28 (or 28a).

As shown by FIG. 4, pin 22 (or 22a), together with swivel 24 (or 24a) is located on one side of member 13 and the head 25 (or 25a) of said pin, together with ball-shaped sleeve 17 (or 17a) is on the other side of said member 13. The latter has the form of a single piece, consisting of a stamped iron sheet. This makes it possible to secure every pin 22 (or 22a) and the two swivel elements it carries by means of a nut 32 (or 32a) screwed on a threaded portion of this pin.

Finally, to keep member 13 in position laterally, its upper edge 29 is given a curved shaped such that it remains constantly engaged in the groove of a roller 30 the spindle 31 of which is fixed to the body element 8, said roller being itself advantageously of the self lubricating liquid-tight type.

The arrangement of FIGS. 3 and 4, has, in addition to the advantages above indicated concerning the construction of FIG. 1, that of being simple in construction and very reliable in operation, even with poorly made pieces or pieces mounted in an imperfect manner.

In a general manner, while the above description discloses what are deemed to be practical and efficient embodiments of the invention, this invention is not limited thereto as there might be changes made in the arrangement, disposition and form of the parts without departing from the principle of this invention as comprehended within the scope of the appended claims.

What I claim is:
1. In a vehicle, in combination, a frame having a longitudinal plane of symmetry, on either side of said plane of symmetry two leaf spring elements of equal respective lengths disposed one above the other substantially in a vertical plane transverse to said plane of symmetry and making a small angle with the horizontal, said spring elements having their inner ends fixed to said frame, a structure of fixed length having its ends pivoted, about respective longitudinal axes parallel to each other and to said longitudinal plane of symmetry, to the outer ends of said spring elements, said respective longitudinal axes being located in a plane inclined with respect to the vertical, whereby the whole formed, on each side of said plane of symmetry, by said two spring elements, said fixed length structure and the portion of said frame located between the respective inner ends of said spring elements constitutes a deformable parallelogram, a pair of pivot bearing means in line with each other forming a portion of each of said structures of fixed length, each pair having the pivot axis thereof located along the line extending between the outer ends of the corresponding spring elements, two steerable road wheels, each of said structures of fixed length including a stub axle for each of said wheels, pivot means carried by each of said stub axles and adapted to cooperate with said pair of pivot bearing means, respec- tively, a knuckle arm rigid with each of said stub axles, two drag links each pivotally connected at a first end thereof to one of said knuckle arms, respectively, and extending transversely to said longitudinal plane, a member pivotally connected at two points thereof with the second ends of said drag links, respectively, means for guiding said member with respect to said vehicle frame so that two points of said member close to said two last mentioned points respectively move along two respective lines located in a transverse plane and substantially parallel to the paths of movement of said first ends of said drag links respectively, and steering means for controlling the transverse displacements of said member.

2. A combination according to claim 1 wherein said member consists of a plate having a curvilinear upper edge, and a roller pivoted to said vehicle frame and provided with a groove adapted to cooperate with said edge which is adapted to engage therein.

3. In a vehicle, in combination, a frame having a longitudinal plane of symmetry, on either side of said plane of symmetry two leaf spring elements of equal respective lengths disposed one above the other substantially in a vertical plane transverse to said plane of symmetry and making a small angle with the horizontal, said spring elements having their inner ends fixed to said frame, a structure of fixed length having its ends pivoted, about respective longitudinal axes parallel to each other and to said longitudinal plane of symmetry, to the outer ends of said spring elements, said respective longitudinal axes being located in a plane inclined with respect to the vertical, whereby the whole formed on each side of said plane of symmetry, by said two spring elements, said fixed length structure and the portion of said frame located between the respective inner ends of said spring elements constitutes a deformable parallelogram, a pair of pivot bearing means in line with each other, forming a portion of each of said structures of fixed length, each pair having the pivot axis thereof located along the line extending between the outer ends of the corresponding spring elements, two steerable road wheels, each of said structures of fixed length including a stub axle for each of said wheels, pivot means carried by each of said stub axles and adapted to cooperate with said pair of pivot bearing means, respectively, a knuckle arm rigid with each of said stub axles, two drag links each pivotally connected at a first end thereof to one of said knuckle arms, respectively, and extending transversely to said longitudinal plane, a member pivotally connected at two points thereof with the second ends of said drag links, respectively, two rods rigidly carried by said frame and located in a transverse plane with respect thereto, said rods being substantially perpendicular to the respective inner sides of said two parallelograms, means for guiding two points of said member along said two rods, respectively, and steering means for controlling the transverse displacements of said member.

4. A combination according to claim 3 wherein said means for guiding two points of said member along said two rods, respectively, comprise two sleeves slidable on said rods, respectively, and pivotally mounted on said member at said last mentioned points respectively.

5. A combination according to claim 3 wherein said steering means comprise a rack pivoted to said member at a point thereof close to one of said two guided last mentioned points thereof, said rack being slidably carried by said vehicle frame so as to be parallel to that of said rods along which said last mentioned point is guided.

6. A combination according to claim 3 wherein said means for guiding two points of said member along said two rods, respectively, comprise two sleeves slidable on said rods, respectively, and pivotally mounted on said member at said last mentioned points respectively and said sleeves are pivotally connected to the second ends of said drag links.

7. A combination according to claim 6 wherein said member is in the form of a plate, said rods being located on one side of said plate and said drag links on the other side thereof.

References Cited by the Examiner

UNITED STATES PATENTS

| 1,886,963 | 11/32 | Lundelius | 280—95 |
| 2,030,822 | 2/36 | Lundelius | 280—95 |
| 2,439,659 | 4/48 | Julien | 180—43 |
| 2,628,109 | 2/53 | Cottrell | 280—95 |

FOREIGN PATENTS 542,765   6/57   Canada.

BENJAMIN HERSH, *Primary Examiner.*
KENNETH H. BETTS, MILTON BUCHLER,
*Examiners.*